Figure 1:
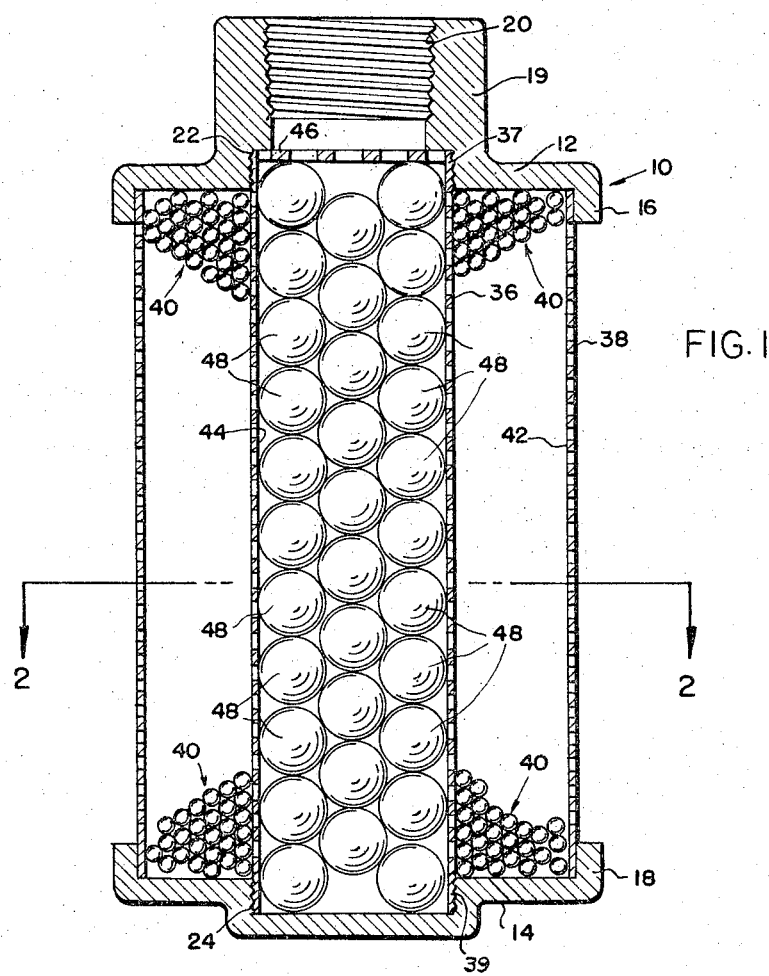

April 4, 1967

N. O. ROSAEN 3,312,349

FILTER ELEMENTS

Filed May 18, 1964

2 Sheets-Sheet 1

INVENTOR.
NILS O. ROSAEN
BY
*Hauke + Hauke*
ATTORNEYS

United States Patent Office 3,312,349
Patented Apr. 4, 1967

3,312,349
FILTER ELEMENTS
Nils O. Rosaen, Bloomfield Hills, Mich., assignor to The Rosaen Filter Company, Hazel Park, Mich., a corporation of Michigan
Filed May 18, 1964, Ser. No. 368,053
15 Claims. (Cl. 210—283)

The present invention relates to fluid systems, particularly to a filter element for such systems and more particularly to an improved construction for such filter elements incorporating a unique filtering means and a novel inner support means.

In conventional filter elements in which a filtering material is sandwiched between concentric cylindrical perforated members there is no means of cleaning the filtering material and when the filter element becomes clogged, it is generally necessary to replace it. The present invention provides a construction in which the means utilized to perform the filtering function can be completely and readily removed from the element for purposes of cleaning. To produce this result, a pair of spaced concentric cylindrical perforated members provide an axially elongated annular filtering space which is filled with filtering means in the form of a plurality of glass or similarly fluid impermeable material beads or balls. In this way it is not only possible to clean the filtering means when the filter element becomes clogged, but if it is desired to increase or decrease the filtering action, new balls or beads of a smaller or a greater diameter can be placed within the filtering space.

When conventional filter elements are utilized in a high pressure system it has been found that there is a tendency for the inherently weak cylindrical perforated members to buckle or collapse as the pressure differential across the element increases. To avoid this, it is common to provide additional strengthening means in the form of ribs, rings, or the like positioned intermediate the cylindrical perforated members or in the space defined by the inner cylindrical member. Utilizing the filtering means of the present invention increases this problem since the balls or beads used to perform the filtering action are in no way secured to the cylindrical perforated members and therefore provide little support to these members. To overcome this problem a novel means for supporting the inner cylindrical member has been provided in the form of a plurality of glass or similarly fluid impermeable material balls, beads or the like which completely fill the area defined by the inner cylindrical perforated member. In one form of the present invention, the beads used for this purpose are preferably of a larger diameter than those used to perform the filtering action so that they in no way interfere with fluid flow through the element. In a second preferred form the beads used to support the inner perforated member are of a smaller diameter than the beads positioned intermediate the perforated members so that a double action filter device is provided as will be described in greater detail below. In either embodiment, the beads will adequately support the inner cylindrical member to prevent it from collapsing even under high pressure in the system. Such a support means provides a filter element which can be much more economically manufactured and assembled than previous filter elements since beads of this nature are relatively inexpensive and the need for strengthening ribs and the like which are difficult and expensive to fabricate and assemble is eliminated.

It is an object then of the present invention to reduce the manufacturing costs of filter elements by providing such an element having relatively inexpensive means for reinforcing and strengthening the inner perforated shell member of the element.

It is another object of the present invention to improve the construction of filter elements and the like by providing an annular cylindrical filtering cartridge comprising a pair of spaced cylindrical perforated shell members and filtering means disposed between the members in the form of a plurality of balls, beads, or the like.

It is another object of the present invention to reduce maintenance costs for fluid systems and the like by providing a filter element for such system having a filtering means which can be readily moved and cleaned when the element becomes clogged.

It is still another object of the present invention to improve the construction of cylindrical annular filtering elements by providing a means of supporting and reinforcing the element in the form of a plurality of glass beads, balls or the like filling the space defined interiorly of the cylindrical filter element.

It is yet another object of the present invention to improve filter devices by providing a cartridge constructed to provide two spaced concentric filtering spaces each being filled with substantially spherical filtering members and with the filtering members of one of the spaces being of larger diameters than the filtering members of the other of the spaces.

Figure 2:
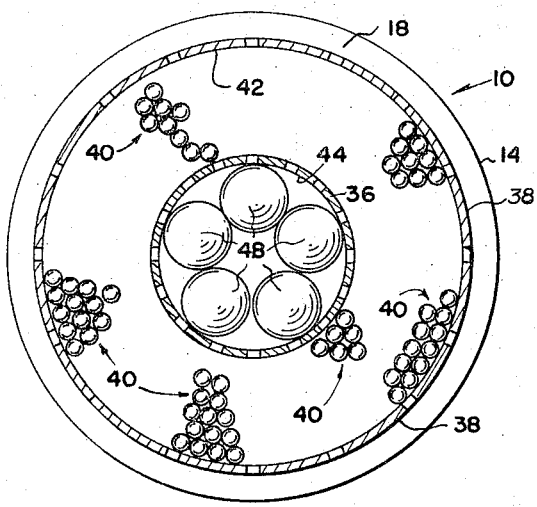
Figure 3:
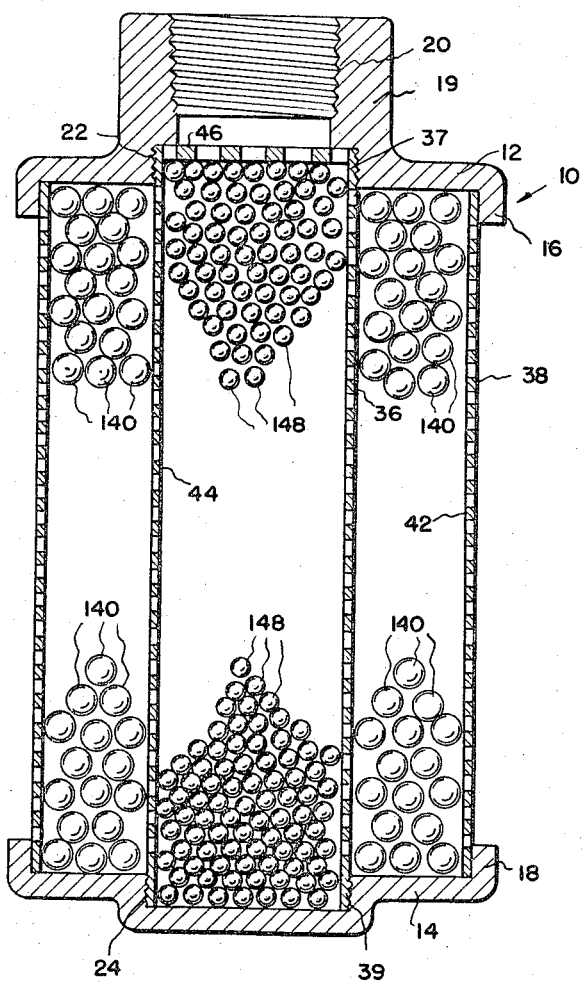

Still further objects and advantages of the present invention will be readily apparent to one skilled in the art to which the invention pertains upon reference to the following drawings in which like reference characters refer to like parts throughout the several views and in which FIG. 1 is a longitudinal cross-sectional view of one preferred filter element of the present invention, FIG. 2 is a cross-sectional view taken substantially at line 2—2 of FIG. 1, and FIG. 3 is a longitudinal cross-sectional view similar to FIG. 1 but illustrating another preferred filter element of the present invention.

Description

Now referring to the drawings for a more detailed description of the present invention, a preferred filter element generally indicated at 10 is adapted to be carried in a conventional filter housing (not shown). The filter element 10 preferably comprises a pair of substantially disc shaped cap members 12 and 14, each provided with an annular axially extending peripheral flange 16 and 18 respectively. The cap member 12 is provided with an axially extending boss 19 and an axially extending outlet port 20. A threated recess 22 is provided on the inner surface of the cap member 12 in axial alignment with the outlet port 20. The cap member 14 is provided with a similar threaded recess 24 on the inner surface thereof. The threaded recesses 22 and 24 provide the means by which a cylindrical, perforated inner shell member 36 is positioned intermediate and carried by the cap members 12 and 14. The inner shell member 36 is provided with externally threaded end portions 37 and 39 which are respectively received by the recesses 22 and 24. An outer cylindrical perforated shell member 38 is disposed in a position concentric to and radially spaced from the inner shell member 36 and is retained in position by the flange portions 16 and 18 of the cap members 12 and 14 respectively.

In the preferred embodiment illustrated in FIGS. 1 and 2 a plurality of beads, balls, or the like, 40, preferably of glass or a similar fluid impermeable material fill the cylindrical annular filtering space 42 defined intermediate the shell members 36 and 38. The beads 40 perform the filtering function for the element 10 of FIGS. 1 and 2 and will hereinafter be called filtering beads. A cylindrical interior outlet space 44 is defined by the inner shell member 36. The space 44 is in communication with the outlet 20 and is closed at the opposite end by the cap member 14. A plurality of beads, balls, or the like, 48, of glass or a similar fluid impermeable material fill the space 44. The beads 48 form a support for the inner shell member 36 and will hereinafter be called support beads. A perforated disc member 46 prevents the support beads 48 from passing through the outlet 20.

It is to be noted that the inner shell member 36 is of a greater axial length than the outer shell member 38 so that tightening the cap member 14 on the lower threaded portion 37 of the inner shell member 36 will cause the outer shell member 38 to be moved upwardly against the cap member 12 to securely lock the outer shell member 38 in position.

In operation of the preferred embodiment illustrated in FIGS. 1 and 2, the fluid to be filtered passes radially inwardly through the outer shell member 38, through the filtering beads 40 and the inner shell member 36 and is discharged axially through the outlet port 20. It is to be noted that the support beads 48 are preferably of a greater diameter than the filtering beads 40 so that sufficiently large fluid paths are provided through and around the support beads 48 so that they perform substantially no filtering function and they will not interfere with the flow through the filter element 10.

When the filter element 10 becomes clogged, the lower cap member 14 is rotated off the inner shell member 36. With the outer shell member 38 held in position, the filtering beads 40 as well as the support beads 48 can be collected for cleaning. Removal of the outer shell member 38 from its cap member permits it to be thoroughly cleaned and exposes the inner shell member 36 so that it too can be cleaned.

It is apparent then that each member of the filter element 10 of the present invention can be readily cleaned upon the element becoming clogged and it should never be necessary to replace the filtering element. This substantially reduces maintenance costs for fluid systems since the filter elements can be used over and over again without replacement. Further, if it is desired to increase or decrease the filtering action produced by the filter element 10, it is only necessary to replace the filtering beads 40 with other similar beads of a greater or smaller diameter depending upon how much filtering is desired. Such a change in the filtering action is not possible with conventional filter elements and if such a change is desired, the old filter element must be replaced with a new one.

The support beads 48 provide a novel means of strengthening the inherently weak inner shell member 36 and permits the filter element 10 of the present invention to be used in filtering systems in which a high pressure differential is produced across the element. Since the support beads 48 prevent collapsing of the inner shell member 36, the outer shell member 38 is also strengthened since the filtering beads 40 prevent radially inward displacement of the outer shell member 36. The support beads 48 as well as the filtering beads 40 are relatively inexpensive since they can be produced from inexpensive materials and because no close tolerances are required.

FIG. 3 illustrates another preferred filter element of the present invention constructed substantially similarly to the embodiment described above with reference to FIGS. 1 and 2 except that the spaces 42 and 44 have been filled with glass or similar fluid impermeable beads, balls or the like 140 and 148, respectively, which are of different relative diameters than the beads 40 and 48 described above. In this preferred embodiment the beads 140 contained within the space 42 are preferably of a larger diameter than the beads 148 filling the outlet space 44. Thus the beads 148 not only perform the function of supporting the inner shell member 36 but they also act as a second filtering means so that in effect a double action filter element is provided.

It is apparent that although I have described but a single embodiment of the present invention other changes and modifications can be made without departing from the spirit of the invention as expressed by the appended claims.

I claim:

1. A filter element comprising:
   (a) a pair of spaced, substantially concentric, cylindrical perforated members positioned to define an annular space between said members and an outlet spaced defined by the innermost one of said members,
   (b) means closing the ends of said spaces,
   (c) filtering means substantially filling said annular space and comprising a plurality of substantially spherical filtering members, and
   (d) a support means for said filter element comprising a plurality of substantially spherical support member substantially filling said outlet space.

2. The filter element as defined in claim 1 and in which said support members are at least as large in diameter as said filtering members.

3. The filter element as defined in claim 1 and in which said support members are of a larger diameter than said filtering members.

4. The filter element as defined in claim 1 and in which at least one of said closing means is selectively removable whereby said support members and said filtering members can be removed for cleaning or replacement.

5. The element as defined in claim 1 and in which said support members are smaller in diameter than said filtering members.

6. A filter element comprising:
   (a) a pair of substantially concentrically positioned perforated shell members defining an annular filtering space and a cylindrical outlet space,
   (b) means closing the ends of said shell members and comprising a pair of end caps, one of said end caps having an outlet communicating with said outlet space and at least one of said end caps being removably secured to said shell members whereby access to said spaces can be made upon removal of one of said end caps,
   (c) a filtering means carried in said filtering space and comprising a plurality of substantially spherical, individually impermeable filtering members substantially filling the filtering space,
   (d) a support means for said filtering element comprising a plurality of substantially spherical, individually impermeable support members filling said outlet space.

7. The element as defined in claim 6, and in which said support members are at least as large in diameter as said filtering members.

8. The element as defined in claim 6 and in which said support members are of a larger diameter than said filtering members.

9. The element as defined in claim 6 and in which said filtering members are constructed of glass.

10. The element as defined in claim 6 and in which said filtering members and said support members are constructed of glass.

11. The element as defined in claim 6 and in which said support members are of a smaller diameter than said filtering members.

12. A filter element comprising
   (a) a pair of circular cap members, each provided with an axially extending peripheral flange,
   (b) one of said cap members being provided with an axially extending port,
   (c) each of said cap members being provided with a threaded annular recess, (d) a perforated inner shell member positioned intermediate said cap members and having means engaging said threaded recesses thereof to secure said cap members one to the other and said shell member therebetween,
(e) an outer cylindrical shell member mounted intermediate said cap members by means of said peripheral flanges,
(f) said inner shell member having a perforated end portion registering with said port and the opposite end of said shell member being closed by said other cap member, and
(g) a plurality of substantially spherical, fluid impermeable members filling the space intermediate said outer and inner shell members.

13. The filter element as defined in claim 12 and including a plurality of similar impermeable members filling the space within said inner shell member.

14. A filter element comprising
(a) a pair of spaced, substantially concentric, cylindrical perforated members positioned to define an annular space between said members and a cylindrical space defined by the innermost one of said members,
(b) means closing the ends of said spaces,
(c) a filtering means substantially filling said annular space and comprising a plurality of substantially spherical filtering members,
(d) a plurality of substantially spherical members substantially filling said cylindrical space.

15. The filter element as defined in claim 14 and in which said last mentioned spherical members are of a different diameter than said first mentioned spherical members.

References Cited by the Examiner
UNITED STATES PATENTS

| | | | |
|---|---|---|---|
| 1,992,718 | 2/1935 | Records | 210—282 X |
| 2,638,228 | 5/1953 | Downey et al. | 210—282 X |
| 3,182,803 | 5/1965 | Chisholm | 210—266 |

REUBEN FRIEDMAN, *Primary Examiner.*

SAMIH N. ZAHARNA, *Examiner.*